United States Patent
Aoshima

(10) Patent No.: US 6,915,470 B2
(45) Date of Patent: Jul. 5, 2005

(54) DATA LOG ACQUISITION CIRCUIT AND DATA LOG ACQUISITION METHOD

(75) Inventor: Masataka Aoshima, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 515 days.

(21) Appl. No.: 10/002,587

(22) Filed: Oct. 25, 2001

(65) Prior Publication Data

US 2002/0083040 A1 Jun. 27, 2002

(30) Foreign Application Priority Data

Oct. 27, 2000 (JP) .................................... P2000-328990

(51) Int. Cl.⁷ ............................................. G06F 11/00
(52) U.S. Cl. .......................... 714/738; 714/25; 714/724
(58) Field of Search ................................. 714/715, 704, 714/718, 723, 724, 738, 799, 45

(56) References Cited

U.S. PATENT DOCUMENTS

| | | | | |
|---|---|---|---|---|
| 4,639,919 A | * | 1/1987 | Chang et al. | ............... 714/743 |
| 4,876,685 A | * | 10/1989 | Rich | ........................... 714/723 |
| 5,305,331 A | * | 4/1994 | Sato et al. | ................... 714/715 |
| 6,442,724 B1 | * | 8/2002 | Augarten | ..................... 714/738 |
| 6,477,672 B1 | * | 11/2002 | Satoh | ......................... 714/721 |
| 6,587,983 B1 | * | 7/2003 | Nakayama | ................... 714/736 |

* cited by examiner

*Primary Examiner*—Guy J. Lamarre
*Assistant Examiner*—John P. Trimmings
(74) *Attorney, Agent, or Firm*—Fish & Richardson P.C.

(57) ABSTRACT

In a data log acquisition circuit 100, the number of executed test patterns counted by a number-of-patterns counter 1, or the address of the test pattern is compared with a predetermined reference value by an identity detection circuit 2. If the number of executed test patterns or the address of the test pattern and the predetermined reference value are data for the same test pattern, an identity signal is supplied to a log mode control circuit 3. The address of the test pattern is written into a log memory 6 at timing adjusted by a timing adjustment circuit 4 correspondingly to a write address of a data log generated by a counter 5 in accordance with an established operation mode. The write address and the address of the test pattern are held temporarily by a flip-flop 9. The number of generated FAIL signals is counted and outputted by a counter 10.

6 Claims, 5 Drawing Sheets

DATA LOG ACQUISITION CIRCUIT AND DATA LOG ACQUISITION METHOD

BACKGROUND OF THE INVENTION

1. Filed of the Invention

The present invention relates to a data log acquisition circuit and a data log acquisition method for acquiring a data log for use in analysis of a defective device.

2. Description of the Related Art

Generally, a defective device is analyzed by use of a log memory storing data obtained from a device under test tested by an IC tester. Data are written into the log memory used for analyzing the defective device by a data log acquisition circuit or the like, so that the data are stored in the log memory to be associated with an address of a test pattern.

SUMMARY OF THE INVENTION

An object of the present invention is to provide a data log acquisition circuit and a data log acquisition method in which FAIL data can be acquired rapidly.

In order to attain the foregoing object, the present invention has the following features. Incidentally, in the following description of sections, a configuration corresponding to an embodiment is shown in parentheses as an example. Reference numerals or the like in the parentheses are reference numerals shown in drawing which will be described later.

According to a first aspect of the invention, there is provided a data log acquisition circuit (for example, a data log acquisition circuit 100 in FIG. 1) for acquiring a data log in correspondence with a test pattern in a test by using an IC tester, comprising:

a number-of-patterns output section (for example, a number-of-patterns counter 1 in FIG. 1) adapted to count a number of an executed test pattern and output a count value thereof;

an identity signal output section (for example, an identity detection circuit 2 in FIG. 1) adapted to compare one of an address of the test pattern and the count value with a predetermined reference value and output an identity signal when the one of the address and the number of the executed test pattern and the predetermined reference value are data for the same test pattern;

an output flag control section (for example, a log mode control circuit 3 in FIG. 1) adapted to control an output flag on a basis of setting of an operation mode when the identity signal outputted by the identity signal output section is inputted;

a write address output section (for example, a counter 5 in FIG. 1) adapted to generate and output a write address of the data log when the output flag is inputted by the output flag control section;

a data log output section (for example, a timing adjustment circuit 4 in FIG. 1) adapted to output the data log at a timing adjusted for writing the address of the test pattern as a data log;

a storage section (for example, a log memory 6 in FIG. 1) adapted to store the data log outputted by the data log output section together with the write address inputted from the address output section.

According to a second aspect of the invention, there is provided the data log acquisition circuit according to the first aspect of the invention, further comprising:

a held data output section (for example, a flip-flop 9 in FIG. 1) adapted to hold the data log and the write address to be stored in the storage section temporarily to output the data log and the write address; and a number-of-FAIL-signals output section (for example, a counter 10 in FIG. 1) adapted to count and output the number of FAIL signal when the FAIL signal is generated.

According to the second aspect of the invention, the data log acquisition circuit comprises the number-of-patterns output section, the identity signal output section, the output flag control section, the write address output section, the data log output section, the storage section, the held data output section, and the number-of-FAIL-signals output section. Accordingly, a required data log of the number of the FAIL signal, the write address of the FAIL data, and so on, can be acquired. Thus, FAIL data can be acquired rapidly.

According to a third aspect of the invention, the data log acquisition circuit according to the second aspect of the invention, wherein the held data output section further including:

a control flag output section (for example, a flip-clop 7 in FIG. 1) adapted to output a control flag when the FAIL signal is generated; and a clock signal mask section (for example, an AND gate 8 in FIG. 1) adapted to output a clock signal masked with the control flag outputted by the control flag output section, wherein the held data output section holds the data log and the write address in synchronism with the clock signal outputted by the clock signal mask section.

According to the third aspect of the invention, the held data output section further comprises the control flag output section and the clock signal mask section. Accordingly, data can be held whenever the FAIL signal is generated. Thus, the write address where the FAIL signal is generated, and the address of the test pattern can be confirmed easily.

According to a fourth aspect of the invention, there is provided a data log acquisition method in a data log acquisition circuit for acquiring a data log in correspondence with a test pattern in a test by using an IC tester, comprising the steps of:

counting a number of an executed test pattern;

outputting the counted value;

comparing one of an address of the test pattern and the number of the executed pattern with a predetermined reference value;

outputting an identity signal when the one of the address and the number of the executed pattern and the predetermined reference value are data for the same test pattern;

controlling an output flag on a basis of setting of an operation mode when the identity signal is outputted;

generating and outputting a write address of the data log when the output flag is outputted;

outputting the data log at a timing adjusted for writing the address of the test pattern as a data log; and storing the data log outputted together with the write address outputted.

According to a fifth aspect of the invention, there is provided the data log acquisition method according the fourth aspect of the invention further comprising the steps of:

outputting the data log and the write address to be stored after holding the data log and the write address temporarily; and counting and outputting the number of a FAIL signal when the FAIL signal is generated.

According to the fifth aspect of the invention, this data log acquisition method comprises the number-of-patterns output step, the identity signal output step, the output flag control step, the write address output step, the data log output step, the storage step, the held data output step, and the number-of-FAIL-signals output step. Accordingly, a required data log of the number of the FAIL signal, the write address of the FAIL data, and so on, can be acquired. Thus, it is possible to provide a data log acquisition method in which FAIL data can be acquired rapidly.

According to a sixth aspect of the invention, there is provided the data log acquisition method according to the fifth aspect of the invention, further comprising the steps of:

outputting a control flag when the FAIL signal is generated; and outputting a clock signal masked with the control flag, wherein the said data log and said write address are held in synchronism with the clock signal.

According to the sixth aspect of the invention, in this data log acquisition method, the held data output step further comprises the control flag output step and the clock signal mask step. Accordingly, data can be held whenever the FAIL signal is generated. Thus, it is possible to provide a data log acquisition method in which the write address where the FAIL signal is generated, and the address of the test pattern can be confirmed easily.

DETAILED DESCRIPTION OF THE PREFERRED EMBODIMENTS

[Embodiment 1]

Description will be given on a data log acquisition circuit 200 according to the embodiment 1 with reference to FIG. 4.

Figure 4:
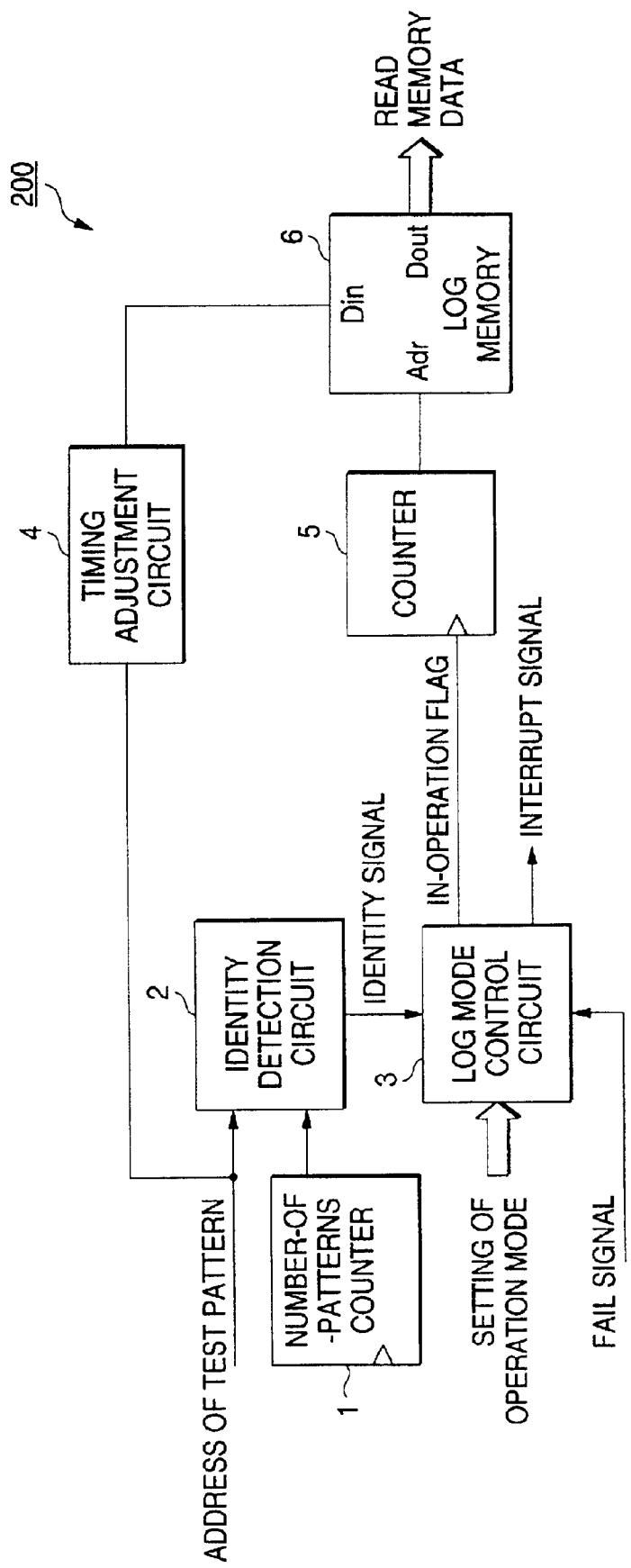
FIG. 4 is a block diagram showing a circuitry of a data log acquisition circuit 200 according to an embodiment 1 of the invention.

FIG. 4 is a block diagram showing a circuitry of the data log acquisition circuit 200 according to the embodiment 1. The data log acquisition circuit 200 comprises a number-of-patterns counter 1, an identity detection circuit 2, a log mode control circuit 3, a timing adjustment circuit 4, a counter 5, and a log memory 6.

The data log acquisition circuit 200 shown in FIG. 4 and a pattern control circuit (not shown) are connected to a control section of a personal computer (not shown) or the like. The pattern control circuit executes a test pattern by use of system software of the personal computer on a basis of the number of executed predetermined test patterns (or an execution range of a test pattern) and an operation mode which will be described later.

A cycle signal is inputted to the above-mentioned control section as a reference clock. The cycle signal is counted by an internal counter (not shown) in the control section. A FAIL check signal is outputted to the data log acquisition circuit 200 (for example, the log mode control circuit 3) whenever the cycle signal is counted 256 times. Then, it is checked whether a FAIL signal has been generated or not.

In FIG. 4, the number-of-patterns counter 1 counts the executed-number-of-patterns of the test pattern, and outputs a count value to the identity detection circuit 2.

A reference value (expected value signal) for each test pattern is set in advance by the above-mentioned system software of the personal computer. The identity detection circuit 2 compares the address of the executed test pattern (or the count value counted by the number-of-patterns counter 1, that is, the number of patterns) with the reference value (expected value signal). If the address of the test pattern and the reference value are data for the same test pattern, the identity detection circuit 2 outputs an identity signal to the log mode control circuit 3.

When the identity signal is inputted from the identity detection circuit 2 to the log mode control circuit 3, the log mode control circuit 3 outputs an in-operation flag (ON/OFF) to the counter 5 in accordance with an operation mode (ALL mode: to write a data log in a predetermined range into the log memory, or FAIL mode: to write a data log corresponding to an input FAIL signal into the log memory) established beforehand by the above-mentioned system software of the personal computer.

That is, when the log mode control circuit 3 is set to the ALL mode, the in-operation flag is turned ON from a time when the identity signal is inputted from the identity detection circuit 2 to a time when the storage capacity of the log memory 6 is occupied. Then, when the storage capacity of the log memory 6 has been occupied, the log mode control circuit 3 issues an interrupt signal to the above-mentioned system software so that the data written in the log memory 6 are read out and outputted to a console (not shown) or an external (personal computer) storage medium (for example, a file or the like). In addition, when the data has been read out, a data write region is shifted correspondingly to the storage capacity of the log memory 6, and the test pattern program is executed again.

On the other hand, when the log mode control circuit 3 is set to the FAIL mode, the in-operation flag is turned ON from the time when the identity signal is inputted from the identity detection circuit 2 to a time when the storage capacity of the log memory 6 is occupied and a FAIL signal is generated. In addition, when the FAIL signal is generated, the log mode control circuit 3 generates an interrupt signal so that the data written in the log memory 6 are read out and outputted to the console (not shown) or the external (personal computer) storage medium (for example, a file or the like).

When the in-operation flag (ON) is inputted from the log mode control circuit 3 to the counter 5, the counter 5 counts up and outputs a count value to the log memory 6 as a write address of a data log.

In addition, the timing adjustment circuit 4 adjusts timing for writing the data log into the log memory, and outputs an address of the executed test pattern to the log memory 6 at the adjusted timing.

The log memory 6 stores the address of the executed test pattern together with the count value (write address of data log) inputted from the counter 5.

Next, an operation of the data log acquisition circuit 200 will be described.

Description will be given about the operation of each part in the data log acquisition circuit 200 shown in FIG. 4 with reference to a timing charts shown in FIGS. 2 and 3.

First, with reference to the timing chart of FIG. 2, description will be given about the operation of each part when the ALL mode has been set as the operation mode.

First, the control section of the personal computer (not shown) connected to the data log acquisition circuit 200 sets the operation mode (ALL mode) for the log mode control circuit 3 and the number of test patterns to be executed (or the test pattern execution range).

Next, upon reception of a test start signal (see FIG. 2(a)) from the control section of the personal computer, an established test pattern is executed. At this time, the control section of the personal computer counts a cycle signal (see FIG. 2(b)) by the internal counter.

Then, when a test pattern is executed, the control section of the personal computer inputs the cycle signal to the number-of-patterns counter 1 to count the number of test patterns, and inputs the address of the test pattern to the identity detection circuit 2.

The number-of-patterns counter 1 counts the number of test patterns, and outputs a count value thereof to the identity detection circuit 2.

In addition, the identity detection circuit 2 compares the inputted address of the test pattern (or the count value supplied from the number-of-patterns counter 1, that is, the number of the test patterns) with a predetermined reference value (an expected value signal). When the address of the test pattern and the predetermined reference value are data for the same test pattern, the identity detection circuit 2 outputs an identity signal (see FIG. 2(c)) to the log mode control circuit 3.

Upon reception of the identity signal, the log mode control circuit 3 turns the in-operation flag (see FIG. 2(d)) ON, and outputs the in-operation flag to the counter 5.

Then, upon reception of an in-operation flag (ON), the counter 5 counts up, and outputs a count value to the log memory 6 as a data log write address.

In addition, the timing adjustment circuit 4 adjusts timing for writing a data log into the log memory 6, and outputs the address of the test pattern to the log memory 6 at the adjusted timing.

Then, when the storage capacity of the log memory 6 has been occupied, the log mode control circuit 3 generates an interrupt signal (see FIG. 2(e)) for the above-mentioned system software.

When the interrupt signal is inputted to the system software, the execution of the test pattern is stopped. Subsequently, the above-mentioned control section of the personal computer reads out data written in the log memory 6, and outputs the data to the console (not shown) or the external (personal computer) storage medium (for example, a file or the like).

In addition, when the data have been completely read out from the log memory 6, the above-mentioned control section of the personal computer shifts the data write region correspondingly to the storage capacity of the log memory 6, resets the execution range of the test pattern so as to start from an address following the address stopped in previous execution, and executes the test pattern program again.

As described above, when the ALL mode is set as the operation mode, a data log corresponding to all of the addresses in the execution range of the test pattern is acquired.

Figure 5:
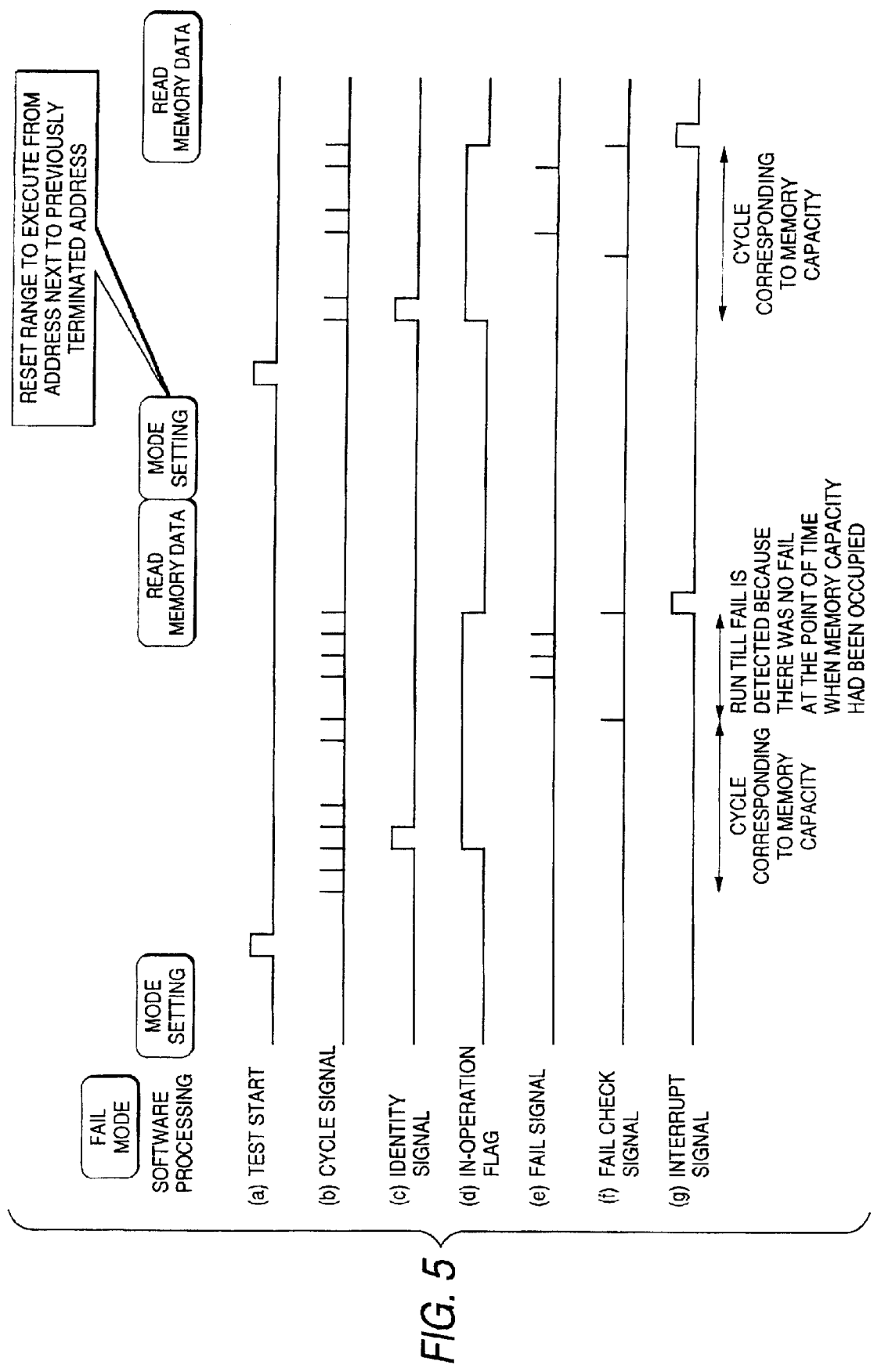
FIG. 5 is a timing chart showing an operation timing of each section when the data log acquisition circuit 200 has been set to a "FAIL mode".

Next, with reference to the timing chart of FIG. 5, description will be given about the operation of each part when the FAIL mode has been set as the operation mode.

First, the control section of the personal computer connected to the data log acquisition circuit 200 sets the operation mode (FAIL mode) for the log mode control circuit 3 and the number of test patterns to be executed (or the test pattern execution range).

Next, upon reception of a test start signal (see FIG. 5(a)) from the control section of the personal computer, an established test pattern is executed. At this time, the control section of the personal computer counts a cycle signal (see FIG. 5(b)) by its internal counter, and outputs a FAIL check signal (see FIG. 5(f)) to the data log acquisition circuit 200 (for example, the log mode control circuit 3) whenever the internal counter counts 256 times.

Then, when a test pattern is executed, the above-mentioned control section of the personal computer inputs the cycle signal to the number-of-patterns counter 1 to count the number of test patterns, and inputs the address of the test pattern to the identity detection circuit 2.

The number-of-patterns counter 1 counts the inputted cycle signal, and outputs a count value thereof to the identity detection circuit 2.

In addition, the identity detection circuit 2 compares the inputted address of the test pattern (or the count value inputted from the number-of-patterns counter 1, that is, the number of the test patterns) with a predetermined reference value (expected value signal). When the address of the test pattern and the predetermined reference value are data for the same test pattern, the identity detection circuit 2 outputs an identity signal (see FIG. 5(c)) to the log mode control circuit 3.

Upon reception of the identity signal, the log mode control circuit 3 turns the in-operation flag (see FIG. 5(d)) ON, and outputs the in-operation flag to the counter 5.

Then, upon reception of an in-operation flag (ON), the counter 5 counts up, and outputs a count value to the log memory 6 as a data log write address.

In addition, the timing adjustment circuit 4 adjusts timing for writing a data log into the log memory 6, and outputs the address of the test pattern to the log memory 6 at the adjusted timing.

Then, when the storage capacity of the log memory 6 has been occupied, the FAIL signal (see FIG. 5(e)) is generated, and the above-mentioned FAIL check signal (see FIG. 5(f)) is inputted, the log mode control circuit 3 outputs an interrupt signal (see FIG. 5(g)) to the above-mentioned system software of the control section.

When the storage capacity of the log memory 6 has been occupied but the FAIL signal has not been generated, the FAIL check signal is not generated. The address of the log memory 6 is returned to first address (0 address) to continue to write into the log memory 6. This operation is continued until the FAIL signal is generated. At a time when the FAIL signal is generated, the interrupt signal to the system software is generated.

When the interrupt signal is inputted to the system software, the above-mentioned control section of the personal computer reads out data written in the log memory 6, and outputs the data to the console (not shown) or the external (personal computer) storage medium (for example, a file or the like).

When the data have been completely read out from the log memory 6, the control section of the personal computer shifts the data write region correspondingly to the storage capacity of the log memory 6, resets the execution range of the test pattern so as to start from an address following the address stopped in previous execution, and executes the test pattern again.

As described above, when the FAIL mode has been set as the operation mode, a data log is acquired from the execution range of the test pattern so as to include an address at which a FAIL signal has been generated.

As has been described above, the data log acquisition circuit 200 acquires a data log for all of the addresses of the test pattern in the ALL mode. On the other hand, in the FAIL mode, the data log acquisition circuit 200 acquires a data log so as to include an address at which a FAIL signal has been generated. Thus, the acquired data log is outputted to the console (not shown) or the external (personal computer) storage medium (for example, a file or the like).

[Embodiment 2]

In the FAIL mode, the data log acquisition circuit 200 according to the embodiment 1 cannot specify the address on the log memory in which the data in FAIL are written. Accordingly, the data log acquisition circuit 200 once reads out the whole data, and then extracts FAIL data from the whole data. Since this processing is carried out by software, it takes much time.

There is a case where only data of the address of the test pattern which becomes FAIL first is required, and alternatively, there is another case where information as to how many FAILs have been generated is required. In both the cases, in the embodiment 1, the whole data are once read out, and required information is then extracted in the same manner. Thus, it takes very much time.

A data log acquisition circuit 100 for improving the above described according to the embodiment 2 will be described below in detail with reference to FIGS. 1 to 3.

First, the configuration will be described.

Figure 1:
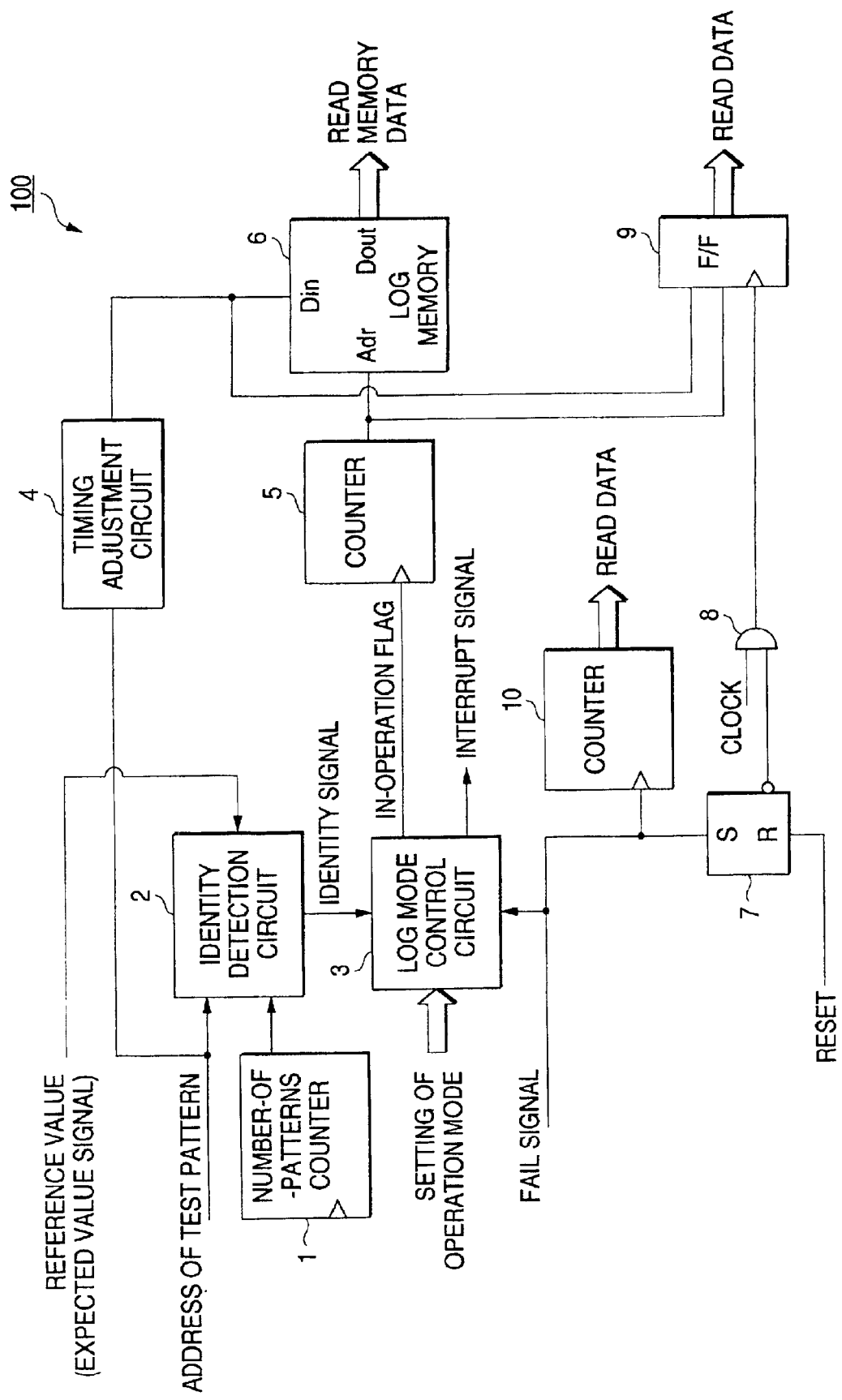
FIG. 1 is a block diagram showing a circuitry of a data log acquisition circuit 100 according to an embodiment 2 of the invention.

FIG. 1 is a block diagram showing a circuitry of the data log acquisition circuit 100 in this embodiment. Constituent parts the same as those in the data log acquisition circuit 200 shown in FIG. 4 are allotted the same reference numerals correspondingly, and detailed description thereof will be omitted.

In FIG. 1, the data log acquisition circuit 100 comprises a number-of-patterns counter 1, an identity detection circuit 2, a log mode control circuit 3, a timing adjustment circuit 4, a counter 5, a log memory 6, a flip-flop 7, an AND gate 8, a flip-flop 9, and a counter 10.

The flip-flop 7 has a set input terminal and a reset input terminal. When a FAIL signal is inputted to the set input terminal, the flip-flop 7 outputs an "L" signal to the AND gate 8. An output signal is reset by the reset output terminal.

The AND gate 8 is inputted a CLOCK signal. The AND gate 8 outputs the CLOCK signal as a clock signal for the flip-flop 9.

When a FAIL signal is generated, that is, when the "L" signal is inputted from the flip-flop 7 to the AND gate 8, the AND gate 8 masks the CLOCK signal, and outputs the masked signal to a clock terminal of the flip-flop 9.

The flip-flop 9 receives, as input signals, the output of the counter 5 and the output of the timing adjustment circuit 4, and outputs data to a console or an external (personal computer) storage medium (for example, a file or the like) in synchronism with the clock signal inputted from the AND gate 8. The flip-flop 9 temporarily holds data (a write address of a data log, and a pattern address) when a FAIL signal is generated.

The counter 10 counts generated FAIL signals, and outputs a count value (that is, the number of the generated FAIL signals) to the console or the external (personal computer) storage medium (for example, a file or the like).

Next, an operation of the data log acquisition circuit 100 will be described.

Description will be given about the operation of each part in the data log acquisition circuit 100 shown in FIG. 1 with reference to a timing charts shown in FIGS. 2 and 3.

First, with reference to the timing chart of FIG. 2, description will be given about the operation of each part when the ALL mode has been set as the operation mode.

First, the control section of the personal computer (not shown) connected to the data log acquisition circuit 100 sets the operation mode (ALL mode) for the log mode control circuit 3 and the number of test patterns to be executed (or the test pattern execution range).

Figure 2:
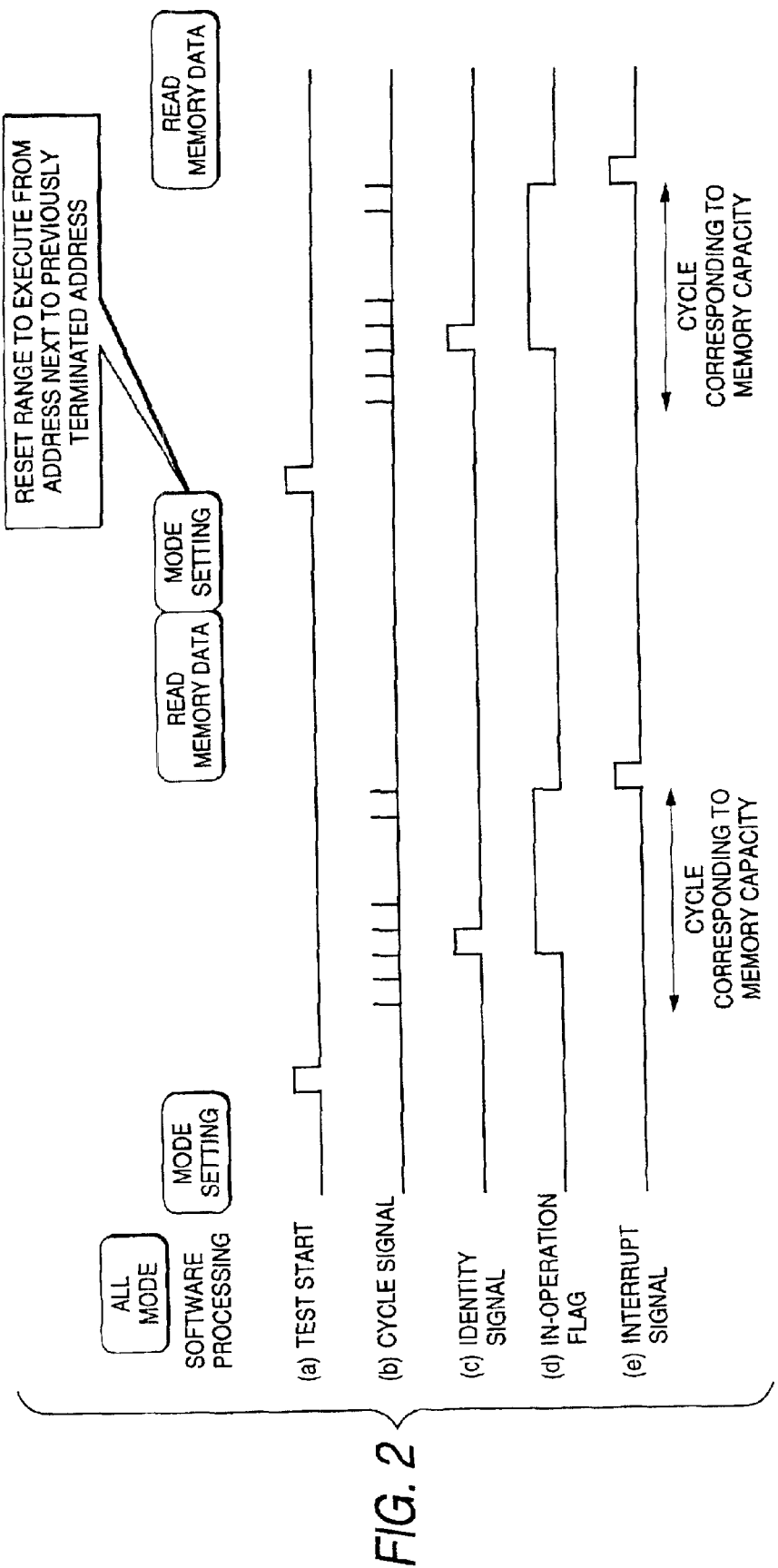
FIG. 2 is a timing chart showing an operation timing of each section when the data log acquisition circuit 100 (200) has been set to an "ALL mode".

Next, upon reception of a test start signal (see FIG. 2(*a*)) from the control section of the personal computer, an established test pattern is executed. At this time, the control section of the personal computer counts a cycle signal (see FIG. 2(*b*)) by the internal counter.

Then, when a test pattern is executed, the control section of the personal computer inputs the cycle signal to the number-of-patterns counter 1 to count the number of test patterns, and inputs the address of the test pattern to the identity detection circuit 2.

The number-of-patterns counter 1 counts the number of test patterns, and outputs a count value thereof to the identity detection circuit 2.

In addition, the identity detection circuit 2 compares the inputted address of the test pattern (or the count value supplied from the number-of-patterns counter 1, that is, the number of the test patterns) with a predetermined reference value (an expected value signal). When the address of the test pattern and the predetermined reference value are data for the same test pattern, the identity detection circuit 2 outputs an identity signal (see FIG. 2(*c*)) to the log mode control circuit 3.

Upon reception of the identity signal, the log mode control circuit 3 turns the in-operation flag (see FIG. 2(*d*)) ON, and outputs the in-operation flag to the counter 5.

Then, upon reception of an in-operation flag (ON), the counter 5 counts up, and outputs a count value to the log memory 6 as a data log write address.

In addition, the timing adjustment circuit 4 adjusts timing for writing a data log into the log memory 6, and outputs the address of the test pattern to the log memory 6 at the adjusted timing.

Then, when the storage capacity of the log memory 6 has been occupied, the log mode control circuit 3 generates an interrupt signal (see FIG. 2(*e*)) for the above-mentioned system software.

When the interrupt signal is inputted to the system software, the execution of the test pattern is stopped. Subsequently, the above-mentioned control section of the personal computer reads out data written in the log memory 6, and outputs the data to the console (not shown) or the external (personal computer) storage medium (for example, a file or the like).

In addition, when the data have been completely read out from the log memory 6, the above-mentioned control section of the personal computer shifts the data write region correspondingly to the storage capacity of the log memory 6, resets the execution range of the test pattern so as to start from an address following the address stopped in previous execution, and executes the test pattern program again.

On the other hand, when a FAIL signal is inputted to the set input terminal of the flip-flop 7, the flip-flop 7 outputs an "L" signal to the AND gate 8 so that the AND gate 8 masks a CLOCK signal and outputs the masked signal to the clock terminal of the flip-flop 9.

Then, upon reception of the masked signal, the flip-flop 9 holds the data (the write address of the data log, and the address of the test pattern) temporarily, and outputs the data to the console or the external (personal computer) storage medium (for example, a file or the like) in synchronism with the clock signal supplied from the AND gate 8 when a signal is inputted from the reset terminal of the flip-flop 7.

Further, the counter 10 counts generated FAIL signals, and outputs a count value (that is, the number of the generated FAIL signals) to the console or the external (personal computer) storage medium (for example, a file or the like).

As described above, when the ALL mode is set as the operation mode, a data log corresponding to all the addresses in the execution range of the test pattern is acquired.

Next, with reference to the timing chart of FIG. 3, description will be given about the operation of each part when the FAIL mode has been set as the operation mode.

First, the control section of the personal computer connected to the data log acquisition circuit 100 sets the operation mode (FAIL mode) for the log mode control circuit 3 and the number of test patterns to be executed (or the test pattern execution range).

Figure 3:
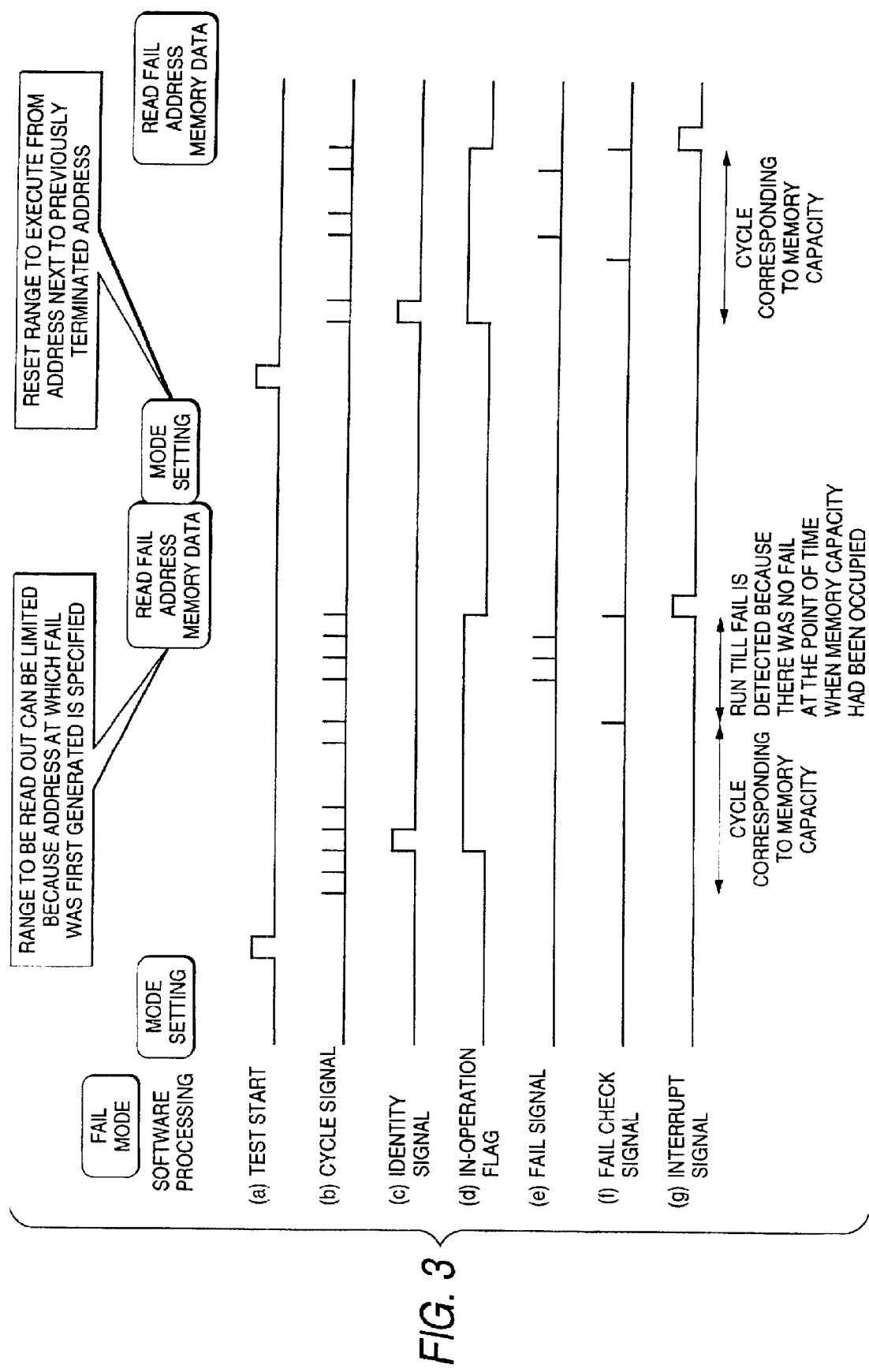
FIG. 3 is a timing chart showing an operation timing of each section when the data log acquisition circuit 100 has been set to a "FAIL mode".

Next, upon reception of a test start signal (see FIG. 3(*a*)) from the control section of the personal computer, an established test pattern is executed. At this time, the control section of the personal computer counts a cycle signal (see FIG. 3(*b*)) by its internal counter, and outputs a FAIL check signal (see FIG. 3(*f*)) to the data log acquisition circuit 100 (for example, the log mode control circuit 3) whenever the internal counter counts 256 times.

Then, when a test pattern is executed, the above-mentioned control section of the personal computer inputs the cycle signal to the number-of-patterns counter 1 to count the number of test patterns, and inputs the address of the test pattern to the identity detection circuit 2.

The number-of-patterns counter 1 counts the inputted cycle signal, and outputs a count value thereof to the identity detection circuit 2.

In addition, the identity detection circuit 2 compares the inputted address of the test pattern (or the count value inputted from the number-of-patterns counter 1, that is, the number of the test patterns) with a predetermined reference value (expected value signal). When the address of the test pattern and the predetermined reference value are data for the same test pattern, the identity detection circuit 2 outputs an identity signal (see FIG. 3(*c*)) to the log mode control circuit 3.

Upon reception of the identity signal, the log mode control circuit 3 turns the in-operation flag (see FIG. 3(*d*)) ON, and outputs the in-operation flag to the counter 5.

Then, upon reception of an in-operation flag (ON), the counter 5 counts up, and outputs a count value to the log memory 6 as a data log write address.

In addition, the timing adjustment circuit 4 adjusts timing for writing a data log into the log memory 6, and outputs the address of the test pattern to the log memory 6 at the adjusted timing.

Then, when the storage capacity of the log memory 6 has been occupied, the FAIL signal (see FIG. 3(*e*)) is generated, and the above-mentioned FAIL check signal (see FIG. 3(*f*)) is inputted, the log mode control circuit 3 outputs an interrupt signal (see FIG. 3(*g*)) to the above-mentioned system software of the control section.

When the storage capacity of the log memory 6 has been occupied but the FAIL signal has not been generated, the FAIL check signal is not generated. The address of the log memory 6 is returned to first address (0 address) to continue to write into the log memory 6. This operation is continued until the FAIL signal is generated. At a time when the FAIL signal is generated, the interrupt signal to the system software is generated.

When the interrupt signal is inputted to the system software, the above-mentioned control section of the personal computer reads out data written in the log memory 6, and outputs the data to the console (not shown) or the external (personal computer) storage medium (for example, a file or the like).

When the data have been completely read out from the log memory 6, the control section of the personal computer shifts the data write region correspondingly to the storage capacity of the log memory 6, resets the execution range of the test pattern so as to start from an address following the address stopped in previous execution, and executes the test pattern again.

On the other hand, when a FAIL signal is inputted to the set input terminal of the flip-flop 7, the flip-flop 7 outputs the "L" signal to the AND gate 8 so that the AND gate 8 masks a CLOCK signal and outputs the masked signal to the clock terminal of the flip-flop 9.

Then, upon reception of the masked signal, the flip-flop 9 holds the data (the write address of the data log, and the address of the test pattern) temporarily, and outputs the data to the console or the external (personal computer) storage medium (for example, a hard disk or the like) in synchronism with the clock signal supplied from the AND gate 8 when a signal is inputted from the reset terminal of the flip-flop 7.

Further, the counter 10 counts generated FAIL signals, and outputs a count value (that is, the number of the generated FAIL signals) to the console or the external (personal computer) storage medium (for example, a file or the like).

As described above, when the FAIL mode has been set as the operation mode, a data log is acquired from the execution range of the test pattern so as to include an address at which a FAIL signal has been generated.

As has been described above, the data log acquisition circuit 100 acquires a data log for all of the addresses of the test pattern in the ALL mode. On the other hand, in the FAIL mode, the data log acquisition circuit 100 acquires a data log so as to include an address at which a FAIL signal has been generated. Thus, the acquired data log is outputted to the console (not shown) or the external (personal computer) storage medium (for example, a file or the like).

In addition, the data log acquisition circuit 100 counts the number of the generated FAIL signals by the counter 10, and outputs the count value thereof to the console (not shown) or the external (personal computer) storage medium (for example, a file or the like).

In addition, the data log acquisition circuit 100 outputs the address of the test pattern executed by the flip-flop 9 and the write address of the data log to the console (not shown) or the external (personal computer) storage medium (for example, a file or the like).

Thus, it is possible to acquire required data such as the number of the FAIL signals, the write address of FAIL data, and so on, only by reading out from the output of the counter 10 and the output of the flip-flop 9 or read out from the data in the console (not shown) or the external (personal computer) storage medium (for example, a file or the like). It is therefore possible to acquire the FAIL data rapidly.

According to a first aspect of the invention, the data log acquisition circuit comprises the number-of-patterns output section, the identity signal output section, the output flag control section, the write address output section, the data log output section, the storage section. According to a second aspect of the invention, the data log acquisition circuit further comprises the held data output section and the number-of-FAIL-signals output section. Accordingly, a required data log of the number of the FAIL signal, the write address of FAIL data, and so on, can be acquired. Thus, FAIL data can be acquired rapidly.

According to a third aspect of the invention, the held data output section further contains the control flag output section and the clock signal mask section. Accordingly, data can be held whenever a FAIL signal is generated. Thus, the write address where a FAIL signal is generated, and the address of a test pattern can be confirmed easily.

According to a fourth aspect of the invention, the data log acquisition method comprises the number-of-patterns output step, the identity signal output step, the output flag control step, the write address output step, the data log output step, the storage step. According to a fifth aspect of the invention, the data log acquisition method further comprises the held data output step and the number-of-FAIL-signals output step Accordingly, a required data log of the number of FAIL signals, the write address of FAIL data, and so on, can be acquired. Thus, it is possible to provide a data log acquisition method in which FAIL data can be acquired rapidly.

According to a sixth aspect of the invention, the held data output step further comprising the control flag output step and the clock signal mask step. Accordingly, data can be held whenever a FAIL signal is generated. Thus, it is possible to provide a data log acquisition method in which the write address where a FAIL signal is generated, and the address of a test pattern can be confirmed easily.

What is claimed is:

1. A data log acquisition circuit for acquiring a data log in correspondence with a test pattern in a test by using an IC tester, comprising:
    a number-of-patterns output section to count a number of an executed test pattern and output a count value thereof;
    an identity signal output section to compare one of an address of the test pattern and the count value with a predetermined reference value and output an identity signal when the one of the address and the number of the executed test pattern and the predetermined reference value are data for the same test pattern;
    an output flag control section to control an output flag on a basis of setting of an operation mode when the identity signal outputted by the identity signal output section is inputted;
    a write address output section to generate and output a write address of the data log when the output flag is inputted by the output flag control section;
    a data log output section to output the data log at a timing adjusted for writing the address of the test pattern as a data log; and
    a storage section to store the data log outputted by the data log output section together with the write address inputted from the address output section,
    wherein, during operation, when the operation mode is in a first state, the data log is acquired from a range of test pattern addresses so as to include an address at which a FAIL signal is generated, and when the operation mode is in a second state, the data log is acquired for all test pattern addresses in the range.

2. The data log acquisition circuit according to claim 1, further comprising:
    a held data output section to hold the data log and the write address to be stored in the storage section temporarily to output the data log and the write address; and
    a number-of-FAIL-signals output section to count and output the number of FAIL signal when the FAIL signal is generated.

3. The data log acquisition circuit according to claim 2, wherein the held data output section further including:
    a control flag output section to output a control flag when the FAIL signal is generated; and
    a clock signal mask section to output a clock signal masked with the control flag outputted by the control flag output section,
    wherein the held data output section holds the data log and the write address in synchronism with the clock signal outputted by the clock signal mask section.

4. A data log acquisition method in a data log acquisition circuit for acquiring a data log in correspondence with a test pattern in a test by using an IC tester, comprising:
    counting a number of an executed test pattern;
    outputting the counted value;
    comparing one of an address of the test pattern and the counted value with a predetermined reference value;
    outputting an identity signal when the one and the predetermined reference value are data for the same test pattern;
    controlling an output flag on a basis of setting of an operation mode when the identity signal is outputted;
    generating and outputting a write address of the data log when the output flag is outputted;
    outputting the data log at a timing adjusted for writing the address of the test pattern as a data log; and
    storing the data log outputted together with the write address outputted,
    wherein, when the operation mode is in a first state, the data log is acquired from a limited range of test pattern addresses so as to include an address at which a FAIL signal is generated, and when the operation mode is in a second state, the data log is acquired for all test pattern addresses in the range.

5. The data log acquisition method according to claim 4, further comprising:
    outputting the data log and the write address to be stored after holding the data log and the write address temporarily; and
    counting and outputting the number of a FAIL signal when the FAIL signal is generated.

6. The data log acquisition method according to claim 5, further comprising:
    outputting a control flag when the FAIL signal is generated; and
    outputting a clock signal masked with the control flag,
    wherein the said data log and said write address are held in synchronism with the clock signal.

* * * * *